United States Patent
Milojicic et al.

(10) Patent No.: US 12,271,764 B2
(45) Date of Patent: Apr. 8, 2025

(54) DYNAMICALLY MODULAR AND CUSTOMIZABLE COMPUTING ENVIRONMENTS

(71) Applicant: HEWLETT PACKARD ENTERPRISE DEVELOPMENT LP, Houston, TX (US)

(72) Inventors: Dejan S. Milojicic, Milpitas, CA (US); Duncan Roweth, Bristol (GB); Derek Schumacher, Auburn, IL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 431 days.

(21) Appl. No.: 17/876,450

(22) Filed: Jul. 28, 2022

(65) Prior Publication Data

US 2024/0036938 A1 Feb. 1, 2024

(51) Int. Cl.
*G06F 9/50* (2006.01)
*G06F 9/54* (2006.01)

(52) U.S. Cl.
CPC ............ *G06F 9/5083* (2013.01); *G06F 9/542* (2013.01)

(58) Field of Classification Search
CPC ....... G06F 9/505; G06F 9/5083; G06F 9/5088
See application file for complete search history.

(56) References Cited

U.S. PATENT DOCUMENTS

| | | | |
|---|---|---|---|
| 10,348,574 B2* | 7/2019 | Kulkarni | H04L 41/0893 |
| 10,693,814 B2* | 6/2020 | Cai | H04L 49/70 |
| 2017/0289002 A1* | 10/2017 | Ganguli | H04L 41/5051 |

* cited by examiner

*Primary Examiner* — Andy Ho
(74) *Attorney, Agent, or Firm* — Dickinson Wright

(57) ABSTRACT

Systems and methods are provided for a modular switch system that comprises disaggregated components, plugins, and managers that enable flexibility to adjust the dynamic configuration of a switch system. This can create modularity and customizability at different times of the lifecycle of the currently configured switch system.

21 Claims, 8 Drawing Sheets

QoSc Characteristics

| Configuration Time | Common | Who Reconfigures | Interconnect |
|---|---|---|---|
| Factory (Once) | Chassis + More | HPE | Slingshot Vs H4 ASIC |
| (Re)order/Customizable Reconfigurable Later (A Few Times) | Everything But Switch | Replaceable In The Lifetime (Customer Or HPE) | Adding Bridges |
| Boot (More Often) | Plugin Cards | Customer | Enable Protocol Features |
| Runtime (Frequent) | Programmatically Reconfigurable Modules | Programmer | Mem. Semantics Vs Put/Get |
| Autonomic (Provide Policy And Let It Run On Your Behalf) | Operating Environment / App Telemetry, Policy Declaration APIs | Fabric/Resource Manager | Dynamic Performance Parameter Tuning Based On Policy/Telemetry |

FIG. 5

DYNAMICALLY MODULAR AND CUSTOMIZABLE COMPUTING ENVIRONMENTS

BACKGROUND

As the computer systems evolve in complexity, it is increasingly difficult to design and configure singular systems for various or all possible use cases. For example, a system may be optimized for high throughput in high performance computing (HPC) systems, for low memory latency in large memory systems, and so forth.

However, it is rare that a single system design can be configured to serve multiple, optimized use cases. As such, systems are often dedicated to a single use case or subset of use cases during their lifetimes. Making such systems modular and customizable at different times in their lifecycles (for example, at purchase, deployment, boot, runtime, and so forth) enables flexibility to broaden the scope of possible use cases and deployments but also increases system costs. Furthermore, effectively enabling such modularity and customizability requires careful design.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
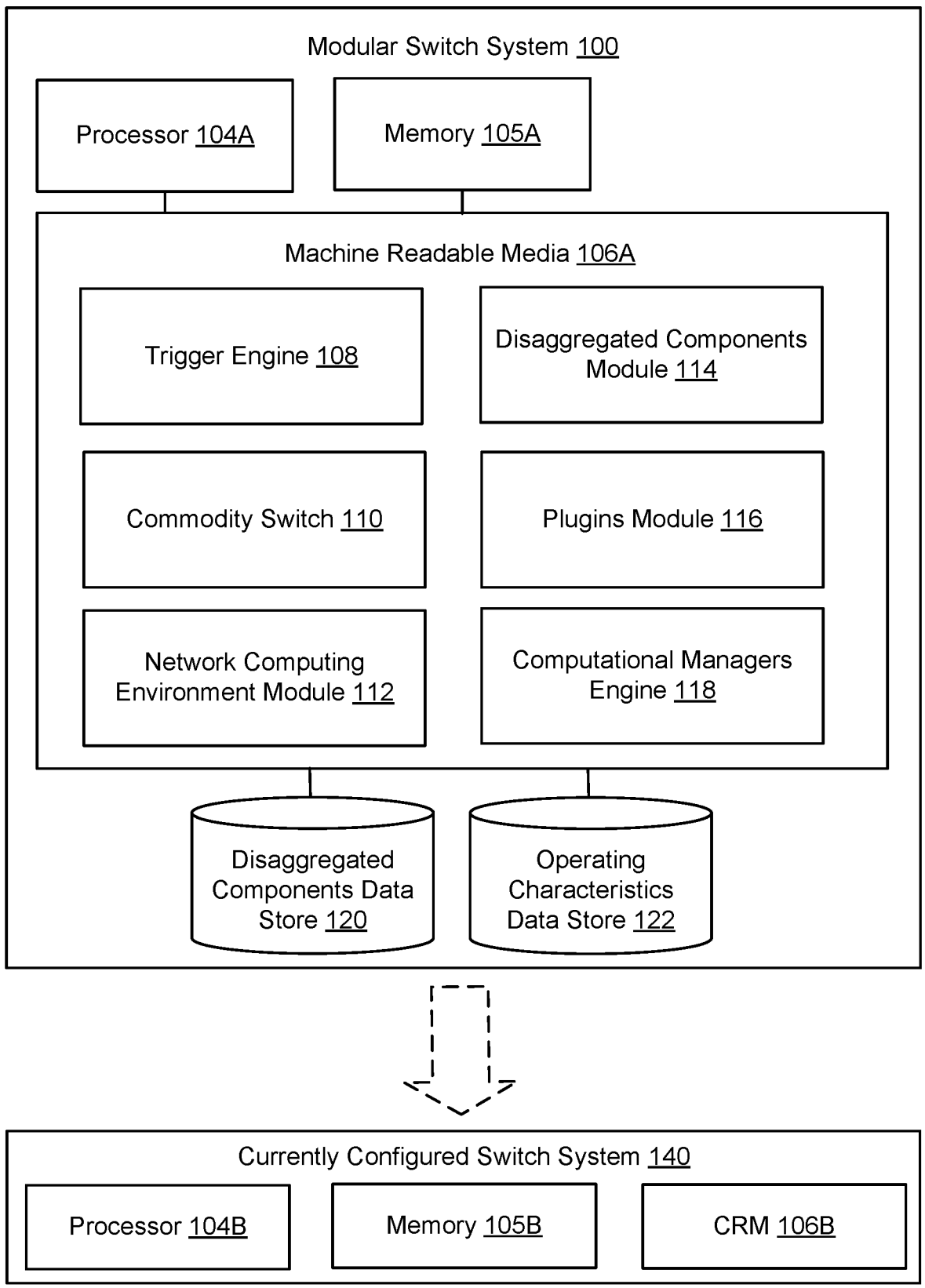
FIG. 1 illustrates a modular switch system and a currently configured switch system, in accordance with one or more examples described herein.

The figures are not exhaustive and do not limit the present disclosure to the precise form disclosed.

DETAILED DESCRIPTION

Examples of the disclosed technology describe a modular switch system (or dynamically modular and customizable switch component, used interchangeably) and one or more configured switch systems that comprise disaggregated components, plugins, and managers that enable flexibility of the configured switch system in terms of modularity and customizability at different times of operation. The modular switch system and one or more configured switch systems may be defined in accordance with pluralities of sets of operating characteristics. For example, the amount of memory, processing power, quality of scaling (QoSc) characteristics, or other features may be defined or adjusted for the currently configured switch system.

The modular switch system may change the virtual or physical components of the currently configured switch system using one or more engines or processes of the modular switch system. The currently configured switch system may be dynamically customizable in accordance with the specifications determined by the modular switch system.

The currently configured switch system and modular switch system may be implemented as a single system or separated systems, where the currently configured switch system may be configured for use cases such as a high-performance computing (HPC) cluster, a large memory system, or a general-purpose cluster deployed in, for example, a cloud environment. A similar design may be propagated up to an operating system or application level. In some examples, the reconfigurability of the disaggregated components of the currently configured switch system is possible and measurable. The reconfigurability of the currently configured switch system can increase the lifetime use of the currently configured switch system while reducing cost of changing the implementation of the system in a production environment.

Comparatively, traditional systems are reliant on technical administrators to manually change cluster components, memory availability, operating systems, applications, or even the physical location of the system. The determination of what needs to change in the traditional system is often determined by switching an installed software application to a second software application, and not determining to reconfigure the system overall. However, with the currently configured switch system, the modular switch system may dynamically select the specifications of the currently configured switch system to create a dynamically customizable system, or select from one or more configured switch systems, that is implemented as the currently configured switch system.

The disclosed technology may provide highly customizable, configurable, and scalable systems that are less expensive than current options and that provide users with an ability to adapt their systems as workload demands shift over time without having to replace such systems. For example, if workload shifts in type of scaling and characteristics from HPC to large memory systems, the disclosed technology enables the currently configured switch system to adapt to the shifting workload demands. Example reconfiguration points may include production of the system, deployment of the system, and various other points during a lifetime of the system. Furthermore, the disclosed technology enables users to maintain customized preferences in terms of configurations, design choices, hardware, software, packaging, interconnect interfaces, or other components of a currently configured switch system.

Additionally, the one or more configured switch systems may correspond with different Quality of Scaling (QoSc) characteristics. QoSc characteristics may define an association of the virtual or physical hardware of a system with the system's ability to change its use for an intended purpose. QoSc characteristics of the one or more configured switch systems may be adjusted dynamically by the modular switch system in order to create a currently configured switch system that has optimized QoSc characteristics for an intended purpose. For example, the QoSc characteristics may correspond with multiple dimensions, from characteristics such as latency or bandwidth values for hardware, to end-to-end characteristics for hardware, operating system, firmware applications, software, and other components of the currently configured switch system.

Technical improvements are realized throughout the disclosure. For example, the disclosed technology can improve computing systems that conventionally comply with long-term static deployments (e.g., supercomputers) by implementing a reconfigurable deployed system through the implementation of clusters of disaggregated components that define the operating characteristics of the network environment. As compared to composable systems that are designed at relatively high cost of production and reconfiguration, the disclosed technology can be cheaper to produce and offer more configurable options for deploying a larger-scale system. Additionally, as compared to cloud infrastructure systems having flexibility but minimal Quality of Scaling (QoSc) characteristic performance requirements of either large memory systems or HPC systems, the disclosed technology provides the flexibility of degrees of scaling by optimizing various QoSc characteristics of several modular switch systems.

As illustrated herein, a modular switch system may act as a controller to create a currently configured switch system in accordance with optimized QoSc characteristics for some intended purpose. In some examples, the modular switch system may select one or more configured switch systems, each of which correspond with different QoSc characteristics, as the framework for creating the currently configured switch system at any point in time.

FIG. 1 illustrates a modular switch system and a currently configured switch system, in accordance with one or more examples described herein. As illustrated, modular switch system 100 comprises processor 104A, memory 105A, and machine-readable media 106A. Currently configured switch system 140 comprises processor 104B, memory 105B, and machine-readable media 106B. As will be discussed in greater detail below, examples of the disclosed technology allow transformations from a generic modular switch, e.g., modular switch system 100, to a configured switch system, e.g., currently configured switch system 140. That is, in some examples, a reconfiguration process may take place where modular switch system 100 is reconfigured into currently configured switch system 140).

Processors 104A, 104B (illustrated as processor 104A with modular switch system 100 and processor 104B with currently configured switch system 140) may be one or more central processing units (CPUs), semiconductor-based microprocessors, and/or other hardware devices suitable for retrieval and execution of instructions stored in machine-readable storage medium 106. Processors 104A, 104B (including one or both of processor 104A with modular switch system 100 or processor 104B with currently configured switch system 140) may fetch, decode, and execute instructions to control processes or operations for implementing the modular switching. As an alternative or in addition to retrieving and executing instructions, processors 104A, 104B may include one or more electronic circuits that include electronic components for performing the functionality of one or more instructions, such as a field programmable gate array (FPGA), application specific integrated circuit (ASIC), or other electronic circuits.

Memories 105A, 105B (illustrated as memory 105A with modular switch system 100 and memory 105B with currently configured switch system 140) and machine-readable medias 106A, 106B (illustrated as machine readable media 106A with modular switch system 100 and machine-readable media 106B with currently configured switch system 140) may also be implemented. For example, memory 105 (including one or both of memory 105A with modular switch system 100 and memory 105B with currently configured switch system 140) and/or machine-readable media 106 (including one or both of machine readable media 106A with modular switch system 100 and machine-readable media 106B with currently configured switch system 140) may comprise random-access memory (RAM) or other dynamic memory, might be used for storing information and instructions to be executed by processors 104A, 104B. Memories 105A, 105B and/or machine-readable medias 106A, 106B might also be used for storing temporary variables or other intermediate information during execution of instructions to be executed by processors 104A, 104B, respectively. Memories 105A, 105B and/or machine-readable medias 106A, 106B might likewise include a read only memory ("ROM") or other static storage device coupled to a bus for storing static information and instructions for processors 104A, 104B, respectively.

Modular switch system 100 may comprise one or more modules that perform processes or operations. The modules may include, for example, trigger engine 108, commodity switch 110, network computing environment module 112, disaggregated components module 114, plugins module 116, and computational managers engine 118.

Trigger engine 108 is configured to generate and transmit a trigger notification (e.g., using an adjustable interconnect or other device) to initiate a dynamic system design reconfiguration of currently configured switch system 140. The trigger notifications may be transmitted between various policy managers that are implemented at the modular switch system 100 or at the currently configured switch system 140. Each trigger notification may be received by trigger engine 108 of modular switch system 100 and trigger engine 108 may responsible for generating, transmitting, and receiving triggers internal to modular switch system 100, as described herein.

Upon receipt of the trigger notification by trigger engine 108, the trigger engine 108 (and corresponding components of modular switch system 100) may initiate an adjustment of the currently configured switch system 140 from a first configured switch system to a second configured switch system, by switching between clusters of disaggregated components that correspond with each system definition.

For example, the currently configured switch system 140 may correspond with a particular cluster of disaggregated components that define a set of operating characteristics. The set of operating characteristics can determine, for example, how much memory or processing power to provide to executing software applications (which predict how fast the applications should run), how much memory the currently configured switch system 140 has access to for executing processes, and other operating characteristics, as defined throughout the disclosure.

In some examples, a trigger notification may be generated in a two-step process, where monitoring data is provided from currently configured switch system 140 to modular switch system 100 in a first trigger notification, and once modular switch system 100 compares the monitoring data (e.g., the workload performed at currently configured switch system 140) with a threshold value, modular switch system 100 may trigger a dynamic reconfiguration of currently configured switch system 140 in a second trigger notification (e.g., sent to commodity switch 110) to initiate the reconfiguration process, as described herein. For example, if the workload is above the threshold value, then modular switch system 100 may reconfigure the currently configured switch system 140 to a first layout and if the workload is below the threshold value, then modular switch system 100 may reconfigure the currently configured switch system 140 to a second layout. Additional detail on the trigger and reconfiguration process is provided with FIG. 3 and throughout the disclosure.

As an illustrative example, a workload may be delayed in response to one or more contentions (e.g., contentions may correspond with workloads on a system that interfere with each other, for example, in an effort to utilize the same resource), latencies, or bandwidth limitations. In some examples, the monitoring data may contain data indicative of contentions, latencies, and/or bandwidths associated with a particular workload. In another example, the workload processed by currently configured switch system 140 may be identified as a workload value and may be compared to a quality of scaling (QoSc) characteristics or other guidelines that are set. When the value fails to exceed the QoSc characteristic (e.g., the threshold value), the workload may be determined to be delayed or hindered because of it (which can activate a reconfiguration of currently configured switch system 140 later in the process). For example, the QoSc characteristics may correspond with multiple dimensions, from characteristics such as latency or bandwidth values for hardware, to end-to-end characteristics for hardware, operating system, firmware applications, software, and other components of the currently configured switch system.

Continuing with the illustrative example, there may be various degrees of QoSc characteristics may be adjusted dynamically, including minimal to maximum values corresponding with various QoSc characteristics, that may be dynamically determined or defined by an administrative user. The minimal value corresponding with a particular QoSc characteristic may determine a minimum amount of hardware resources for a configured switch system without hardware optimizations. The next level of the particular QoSc characteristic may correspond with a hardware-optimized value of the QoSc characteristic, which determines a latency value and determines the hardware configuration to reduce latency experienced by the hardware components of commodity switch 110 (described below). The next level of the particular QoSc characteristic may correspond with a system-optimized value corresponding to the particular QoSc characteristic, which determines a latency value and reduces the latency for the firmware, operating system, and/or middleware components of the modular switch system, in addition to any of the previous components (e.g., hardware, etc.). The next level of the particular QoSc characteristic may be the maximum level, which determines a latency value and reduces it for each of the software applications and each of the previously described components of the modular switch system.

In each of the workload and threshold examples, the workload (e.g., transmission rate, error rate, etc.) may be measured to determine a workload value, or a metric associated with the workload (e.g., bits per second for a transmission rate workload or number of errors per hour for an error rate workload, etc.), and the workload value may be compared with a threshold value. When the workload value exceeds the threshold value, the trigger notification may be generated by trigger engine 108.

In another example, the measurement of the workload may correspond with the workload processed at a particular location, including a local workload (e.g., within a local domain or under one switch) or a system-wide workload (e.g., across multiple domains or crossing multiple switches). When the workload processed at a particular location exceeds a threshold value set for that characteristic, the system may be reconfigured to cause other devices/applications/layers to take over more or less of the workload processing. The identification of the workload exceeding a threshold may initiate a generation of a trigger (from trigger engine 108), and the trigger can initiate the reconfiguration of the currently configured switch system. In some examples, different communication patterns may cause triggers to propagate upwards in the stack (e.g., from OS to application layer, etc.), causing either redeployment of the workload or reconfiguration of the switches, which may also adjust the measurement of the workload. In this reconfiguration example, the rest of the system can accommodate traffic in the long run (e.g., by initiating a traffic balancing or redirection process to other devices in the network).

In other examples, the workload may be defined by a pattern. For a system configuration, trigger engine 108 may identify latency in data transmissions that occur repeatedly in a pattern, where the number of data transmissions that are delayed in a predetermined period of time occur over a threshold value. In another example, trigger engine 108 may identify a range contention that is greater than a threshold value, or bandwidth is measured less than a gigabit per second threshold value. In a range contention (e.g., relating to access to a memory range from different nodes), the trigger engine 108 may trigger a reconfiguration of a switch system (e.g., the currently configured switch system 140 of FIG. 1) from a standard-scale memory to a large-scale shared memory configuration, which may be more optimal for the shared memory access patterns.

In other examples, the workload may be defined by geographic characteristics. For example, the layout or landscape of the system may identify proxy devices representing one or more interfaces to external systems from the currently configured switch system 140. In this example, instead of recognizing traffic patterns to trigger a workload, the proxy device can be programmed using an interface to help identify patterns or application behaviors, and to associate the determined patterns or application behaviors as the workload. The instructions may be interpreted (e.g., by commodity switch 110) to decide how to reconfigure the currently configured switch system 140 and at which level, as described herein. In some examples, the identified proxy devices may be used to learn about suggested workload behaviors, including how to improve operating behaviors in comparison to the proxy devices that may adjust traffic balancing or redirection processes for currently configured switch system 140.

In other examples, the workload may be defined by time patterns. For example, a deployed software application may be implemented progressively over time (e.g., a soft adjustment) whereas an application that is not deployed may be adjusted at one time. The differences in implementation may help correlate the deployment of the application with a predictable pattern of changing the application for end user devices.

In other examples, the trigger notification may correspond with a set of operating characteristics. For example, the operating characteristics may change the set of configurable options from processing the workload over a latency threshold to processing the workload over a bandwidth threshold. In another example, the operating characteristics may change the set of configurable options to define different hardware requirements of a network interface controller (NIC).

In other examples, the trigger notification may correspond with a request for reconfiguration from a user device that is in communication with modular switch system 100. In this example, a user of the system may identify that the purpose of currently configured switch system 140 should change from a first configured switch system to a second configured switch system. The request from the user device may be identified as a trigger notification to dynamically adjust the currently configured switch system to the disaggregated components corresponding with the second configured switch system.

Commodity switch 110 is configured to identify or select a configured switch system (e.g., upon receiving the trigger notification or at a predetermined interval of time, or upon monitoring a workload of currently configured switch system 140 in another manner). The currently configured switch system 140 is defined in accordance with a set of operating characteristics. For example, the amount of memory, processing power, quality of scaling (QoSc) characteristics, or other features may be defined or adjusted for the particular system.

Commodity switch 110 is configured to determine a class of workload by measuring data received or transmitted by the modular switch system 100. The measuring may be performed continuously or in association with a predetermined time interval.

In some examples, upon receiving the trigger notification, commodity switch 110 is configured to determine a cluster of disaggregated components that are implemented (by disaggregated components module 114). The cluster of disaggregated components may comprise a policy manager, one or more configurable options, and a plugin.

The policy manager (implemented by computational managers engine 118) is a computational application configured to measure characteristics of its corresponding computational operation layer. The policy managers may comprise one or more fabric managers, resource managers, and applications managers.

For example, a fabric manager is a software component that initiates reconfiguration of fabrics by instructing fabric plugin to do so. Fabric manager may act based on specified policies provided by system administrator. The fabric manager may measure data transmitted between device connections (e.g., between Packet Forwarding Engines (PFEs) in a switching fabric). The switching fabric may consist of Switch Interface Boards (SIBs) which provide the interconnection between the PFEs across Flexible PIC Concentrators (FPCs).

In another example, a resource manager a software component that initiates reconfiguration of system resources (e.g., processors, memory, storage, etc.) by instructing the operating system plugin to do so and/or lower layers by instructing fabric manager. The resource manager may act based on specified policies provided by a system administrator. The resource manager may measure CPU, memory, storage, and network usage and traffic data. The resource manager may decide when to switch resource configurations (e.g., memory, processor, etc.) for particular software applications (e.g., to improve image processing, to improve user experience, etc.).

In another example, an application manager a software component that initiates reconfiguration of application by instructing application plugin to do so and/or lower layers by instructing resource manager. Application manager may act based on specified policies provided by a system administrator or system programmer. The application manager may measure application specific metrics.

The one or more configurable options of the clusters of disaggregated components may correspond with configurable options of a currently configured switch system. For example, the one or more configurable options may define the amount of processor power to process a workload received at the currently configured switch system, or the amount of memory to use in a cache memory device in accordance with the each of the set of operating characteristics. In some examples, the one or more configurable options may be adjusted in a virtual environment automatically and in real time, while the one or more configurable options may be adjusted in a physical environment through manual intervention.

The plugin (implemented by plugins module 116) may correspond with an application plugin, operating system plugin, firmware plugin, or other types of plugins implemented at various layers of a computing environment that adds a specific feature to an existing computer program (e.g., to enable customization). For example, the plugin may be configured to implement the set of operating characteristics of each cluster of disaggregated components. The application plugin may be configured to implement the set of operating characteristics of one or more applications, its configuration, and its components. The operating system plugin may be configured to implement the set of operating characteristics of the operating system, its configuration, and its components. The firmware plugin may be configured to implement the set of operating characteristics of the individual systems governed by the firmware in question, such as bootstrap configuration, partitions, coherency domains, and devices included in configuration and their operating characteristics. The fabric plugin may be configured to implement the set of operating characteristics of the topology, switches, routers, and the operating characteristics of individual switches.

In some examples, upon receiving the trigger notification, commodity switch 110 is configured to determine a cluster of disaggregated components that are implemented, for example, in a bottom-to-top format (e.g., fabric to resource to application, or other implemented format). For example, commodity switch 110 may access a plurality of policy managers, where each policy manager corresponds with a different aspect of the system. The policy managers may correspond with, for example, a fabric layer, a component layer, a system layer, and an application layer.

In some examples, the managers and plugins may be organized in a hierarchy. For example, the managers may contain policies (e.g., computer-implemented instructions and rules) and the plugins may implement the mechanisms for performing the actions by the system. In some examples, the plugins may upcall alerts and information, and the managers may issue commands as a response.

The policy managers may provide a response to commodity switch 110 that comprises one or more commands. As an illustrative example, the response includes an alert to traffic changes that may warrant the change to the currently configured switch system 140 configuration, but the response may also comprise events, such as failures, perceived security attacks, etc.

Commodity switch 110 may compare the responses from the policy managers to determine whether a consensus is reached among the policy managers. If a consensus is reached, commodity switch 110 may identify that a reconfiguration can be initiated in accordance with the consensus of the plurality of policy managers. The reconfiguration may be implemented end-to-end and up-and-down the cluster of disaggregated components. With each change to the cluster of disaggregated components, different operating characteristics for the currently configured switch system are implemented to correspond with the new cluster of disaggregated components.

In some examples, one or more plugins may query the policy managers to provide an alert associated with a continuous evaluation of the currently configured switch system 140 or in accordance with a time frame (e.g., every day, every week, etc.). For example, alerts may be issued by the plugins (e.g., lower-level entities) to higher level devices or entities at the same domain (e.g., switch, firmware, operating system, and application) or across multiple domains. The alerts may identify some behavior that requires action within a timeframe. Because the policy managers contain the policies and other computer-implemented rules, the policy managers may be best positioned to issue request to initiate actions. In some examples, commodity switch 110 may adjust characteristics to the new equilibrium based on the continuous reevaluation of the workload corresponding with the configured switch system.

Network computing environment module 112 is configured to define a configuration of a computing system by selecting one of a plurality of pre-defined currently configured switch systems, including a high-performance computing (HPC) system, low latency in large memory systems, a large memory system, or a general-purpose cluster deployed in, for example, a cloud environment. The definition of the currently configured switch system may be determined by the virtual or physical disaggregated components associated with the currently configured switch system, which determines how fast, efficient, or accurate the currently configured switch system can process the workload it receives.

In some examples, network computing environment module 112 may define a minimum value to correspond with the set of operating characteristics for a particular configured switch system. For example, the set of operating characteristics may define large memory components or systems scalability that correspond with the currently configured switch system.

In some examples, a template configuration may be determined for the particular configured switch system. The template may define on which values of the QoSc characteristics need to be met so that commodity switch 110 can adjust the operating characteristics to correspond with the definition of that configured switch system. This may include increasing sizes of memory, adjusting configurations or applications. In some examples, a value of the QoSc characteristic may define a performance requirement of a component of the system. The performance requirement (e.g., maximum latency allowed, minimum bandwidth allowed, etc.) may be defined for the configuration and applications may be adjusted to meet performance, scale, reliability, tail-latency, or other operating characteristics. In some examples, interface components and functions may be implemented to increase or enable runtime verification and attestation.

Various system configurations may be determined for each of the plurality of pre-defined configured switch systems. For example, the pre-defined configured switch systems may comprise one computing node with minimal large memory configuration (e.g., one terabyte of data), a stand-alone one-rack system or smaller, a cluster of multiple racks and multiple computing nodes, geographically-distributed nodes utilizing "as a service" (aaS) remote or cloud-based function calls, disaggregated memory, or applications. As illustrative examples, the applications may include high performance computing (HPC) applications (e.g., scientific computing or finite element modelling), large memory applications (e.g., in-memory database to scale-up or scale-down, or graph processing), or cloud (e.g., in-memory to scale-out, machine learning, deep learning, or collaborative applications).

Disaggregated components module 114 is configured to determine and adjust one or more clusters of disaggregated components, where a plurality of clusters of disaggregated components may be defined for a configured switch systems. For example, a cluster of disaggregated components may comprise memory, processor, network connections, hardware, firmware, system software, application stack, or other components that can define the operating characteristics of a computing device.

In some examples, disaggregated components module 114 is configured to adjust the clusters of disaggregated components in accordance with the currently configured switch system at a particular time interval or trigger notification, including at run-time or at boot-time. For example, different types of plugins may exist for different configurations. In other examples, plugins may be reconfigured or replaced with the corresponding plugin for the given configuration.

Plugins module 116 is configured to implement one or more plugins corresponding with a new configuration of the currently configured switch system 140. The plugins may, for example, monitor different types of information that is configuration specific, execute an action that is pertinent to the configuration in question, or other actions.

Computational managers engine 118 is configured to access the policies that correspond to the configuration in question and be able to invoke their execution using plugins. In some examples, computational managers engine 118 may interact with plugins module 116 to invoke the execution of the plugins.

Figure 2:
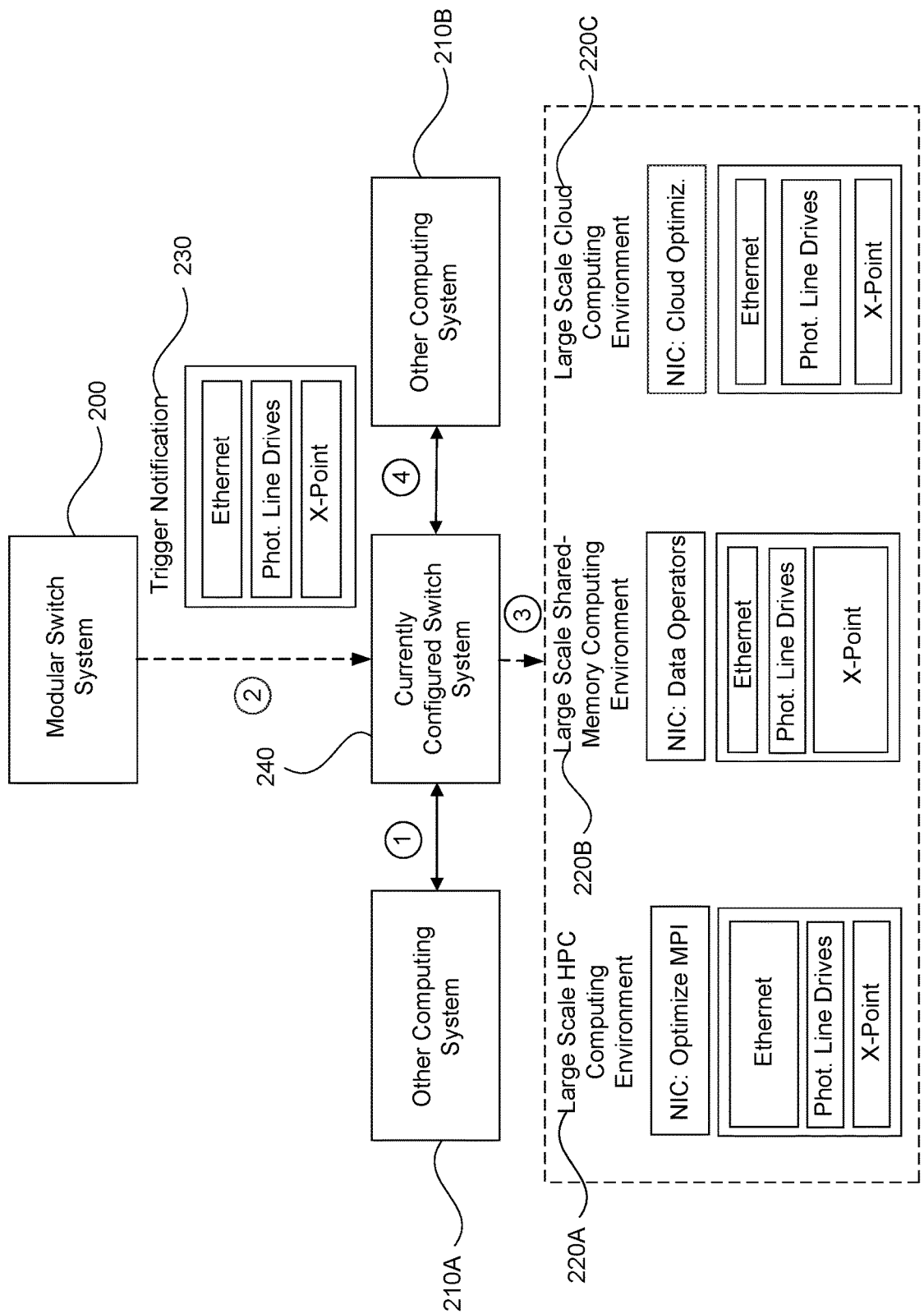
FIG. 2 illustrates switching between a plurality of configured switch systems by the modular switch system, in accordance with one or more examples described herein.

FIG. 2 illustrates switching between a plurality of computing environments by the modular switch system, in accordance with one or more examples described herein. In this illustration, modular switch system 200 and currently configured switch system 240 in FIG. 2 corresponds with modular switch system 100 and currently configured switch system 140 in FIG. 1, respectively.

As discussed above, in some examples, a reconfiguration process may take place where modular switch system 200 is reconfigured into currently configured switch system 240).

At step 1, currently configured switch system 240 communicates via a network connection with one or more other computing systems, including a first other computing system 210A and a second other computing system 210B. The communications between currently configured switch system 240 and one or more other computing systems 210A may transmit data between the devices, depending on the configuration of currently configured switch system 240.

As an illustrative example, currently configured switch system 240 may be configured as a high performance computing (HPC) device, so the operations performed by currently configured switch system 240 may process the data received from one or more other computing systems 210A at high speeds (e.g., quadrillions of calculations per second in an HPC configuration vs. billions of calculations per second in a non-HPC configuration) based on the cluster of disaggregated components associated with the HPC configuration. Currently configured switch system 240 may execute a workload from one or more other computing systems 210A in accordance with the operating characteristics of the cluster of disaggregated components of the HPC configuration (e.g., corresponding with a first configured switch system).

At step 2, modular switch system 200 may monitor the workload processed by currently configured switch system 240 and/or receive a trigger notification associated with the workload processed by currently configured switch system 240. When the workload exceeds a threshold value, modular switch system 200 may determine a second configured switch system (to be transformed/reconfigured into) that is different than the active one, which corresponds with a first configured switch system.

Each of the first and second configured switch systems correspond with a plurality of clusters of disaggregated components that define the set of operating characteristics of each configured switch system. Types of modular switch systems 220 are illustrated as first configured switch system 220A, second configured switch system 220B, and third configured switch system 220C.

First configured switch system 220A in FIG. 2 may correspond with a large scale HPC computing environment, but any configured switch system is possible in various implementations of the disclosure. For example, in the HPC computing environment, the NIC may optimize the Message Passing Interface (MPI) or other parallel computing architecture, which allows for high efficiency in processing electronic communications with one or more other computing systems 210. In some examples, the ethernet (or other communication protocol) may be increased, while photo line drives and X-point may be decreased.

Second configured switch system 220B may correspond with a large scale shared-memory computing environment, but any configured switch system is possible in various implementations of the disclosure. For example, in the large scale shared-memory computing environment, the NIC may optimize the data operators, which allows for performance improvements stemming from cross-network trip reduction, data filtering and/or manipulation close to the data, or other characteristics of the configured switch system. In some examples, the ethernet (or other communication protocol) and photo line drives may be decreased, while the X-point may be increased.

Third configured switch system 220C may correspond with a large-scale cloud computing environment, but any configured switch system is possible in various implementations of the disclosure. For example, in the large-scale cloud computing environment, the NIC may be tuned for cloud optimization by enabling QoSc characteristics required for specific customers that are using parts of the Cloud in question. This may increase or decrease a number of photonic line drives for this configuration compared to other configurations. In some examples, the ethernet (or other communication protocol) and X-point may be decreased, while the photo line drives may be increased.

At step 3, one of the illustrative configured switch systems is used to adjust currently configured switch system 240 to correspond with a second configured switch system. In other words, one of first, second, or third configured switch systems 220A, 220B, 200C, respectively can comprise a currently configured switch system 240 into which modular switch system 200 may be reconfigured. For example, if first configured switch system 220A is the currently configured switch system 240 being used, a switch to second configured switch system 220B or third configured switch system 220C may be effectuated.

At step 4, currently configured switch system 240 may process the workload in accordance with the disaggregated components of second configured switch system that are now implemented as the currently configured switch system 240. In other words, currently configured switch system 240 communicates via a network connection with one or more other computing systems, including a first other computing system 210A and a second other computing system 210B, using the new configuration settings of currently configured switch system 240.

Figure 3:
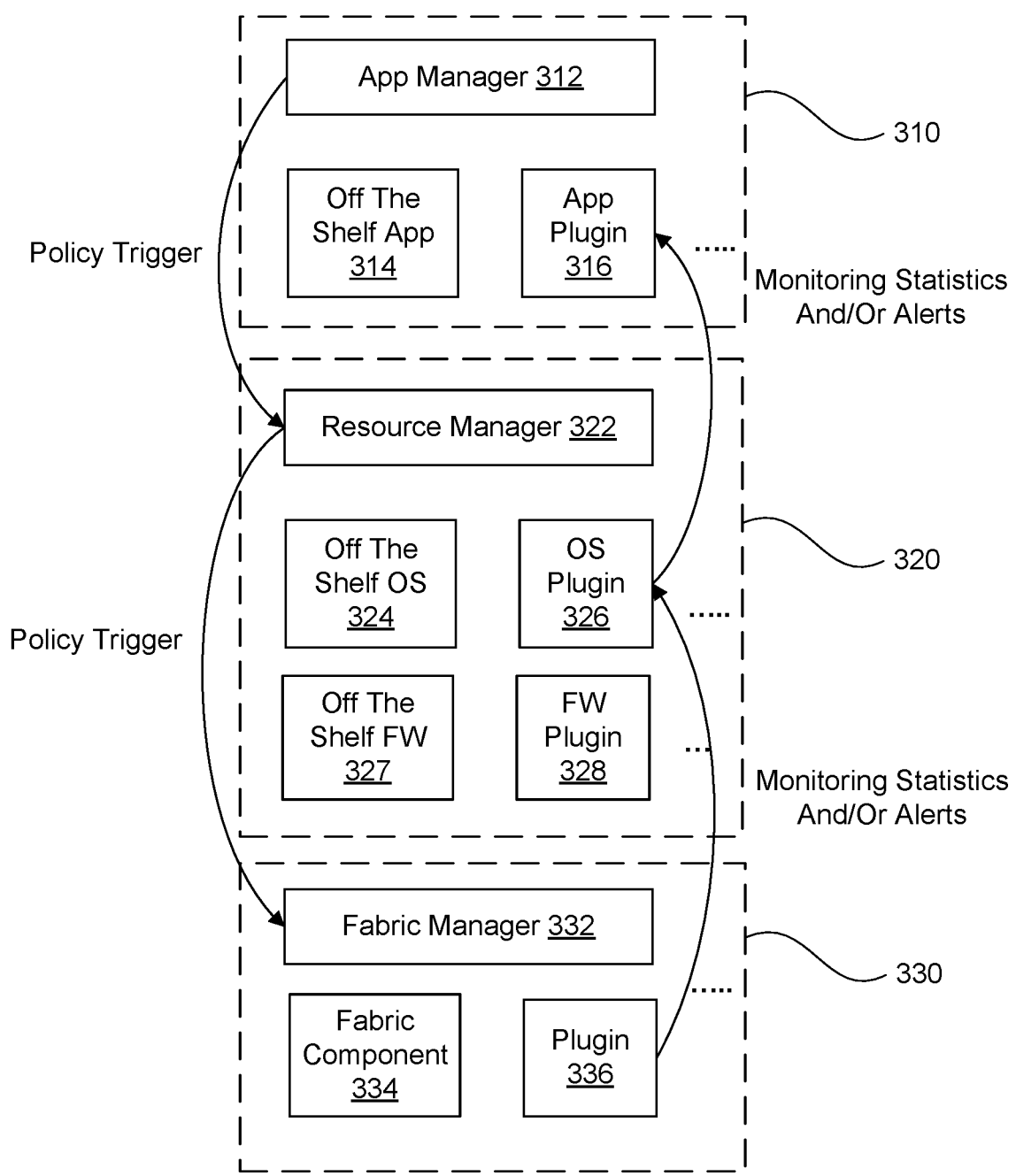
FIG. 3 illustrates a trigger process adjusting clusters of disaggregated components between the plurality of configured switch systems, in accordance with one or more examples described herein.

FIG. 3 illustrates a trigger process adjusting clusters of disaggregated components between the plurality of computing environments, in accordance with one or more examples described herein. For example, a similar triggering process described in FIG. 2 may be implemented in FIG. 3 using the various policy managers, including one or more fabric managers, resource managers, and applications managers in order to adjust characteristics of different components of the system. Partitioning, clustering, application components, and other features of the currently configured switch system 240 may be adjusted by the modular switch system 200.

As discussed herein, various implementations are available. For example, various policy managers may be implemented at the modular switch system 200 or at the currently configured switch system 240. The modular switch system 200 or the currently configured switch system 240 may be implemented at the same physical device or implemented in separate physical locations. When the various policy managers are implemented at the currently configured switch system 240 separate from the modular switch system 200, the trigger process described herein may transmit notifications to the modular switch system 200 to initiate changes at the currently configured switch system 240. When the various policy managers are implemented at the currently configured switch system 240 at the same physical location of the modular switch system 200, the modular switch system 200 may identify triggers described herein absent transmissions of the triggers. Various implementations are available without diverting from the essence of the disclosure.

At block 310, the application manager 312 can initiate reconfiguration of the application 314 by instructing the application plugin 316 to do so. In some examples, the application manager 312 may instruct lower layers of the currently configured switch system 240 (e.g., operating system (OS) 324, firmware 327, etc.) by instructing the resource manager 322. These actions may be based on specified policies provided by a system administrator or system programmer. As an example, a user may create and/or modify one or more policies via the user interface of a device connected via a network to a policy manager. The application manager 312 may measure application-specific metrics (e.g., workload metrics including latency, error rate, etc.).

At block 320, the resource manager 322 can initiate reconfiguration of the system resources (e.g., processors, memory, storage, etc.) by instructing the operating system plugin 326 to do so. In some examples, resource manager 322 can initiate reconfiguration of the firmware (e.g., permanent software programmed into read-only memory of the currently configured switch system 240) by instructing the firmware plugin 328 to do so. In some examples, the resource manager 322 may instruct lower layers of the currently configured switch system 240 (e.g., processors, memory, storage, etc.) by instructing the fabric manager 332. These actions may be based on specified policies provided by a system administrator. The resource manager 322 may measure CPU, memory, storage, and network usage and traffic data and may decide when to switch resource configurations (e.g., memory, processor, etc.) for particular software applications (e.g., to improve image processing, to improve user experience, etc.).

At block 330, the fabric manager 332 can initiate reconfiguration of the fabrics (e.g., fabric component 334, etc.) by instructing fabric plugin 336 to do so. The fabric manager 332 may act based on specified policies provided by system administrator. The fabric manager 332 may measure data transmitted between device connections (e.g., between PFEs in a switching fabric). The switching fabric may consist of SIBs which provide the interconnection between the PFEs across FPCs.

In some examples, one plugin, including application manager 312, resource manager 322, or fabric manager 332, may transmit monitoring statistics or alerts to a plugin 316, 326, 328, 336 in a different layer. As illustrated, the fabric plugin 336 may transmit monitoring statistics or alerts to the OS plugin 326, and the OS plugin 326 may transmit monitoring statistics or alerts to the application plugin 316.

Figure 4:
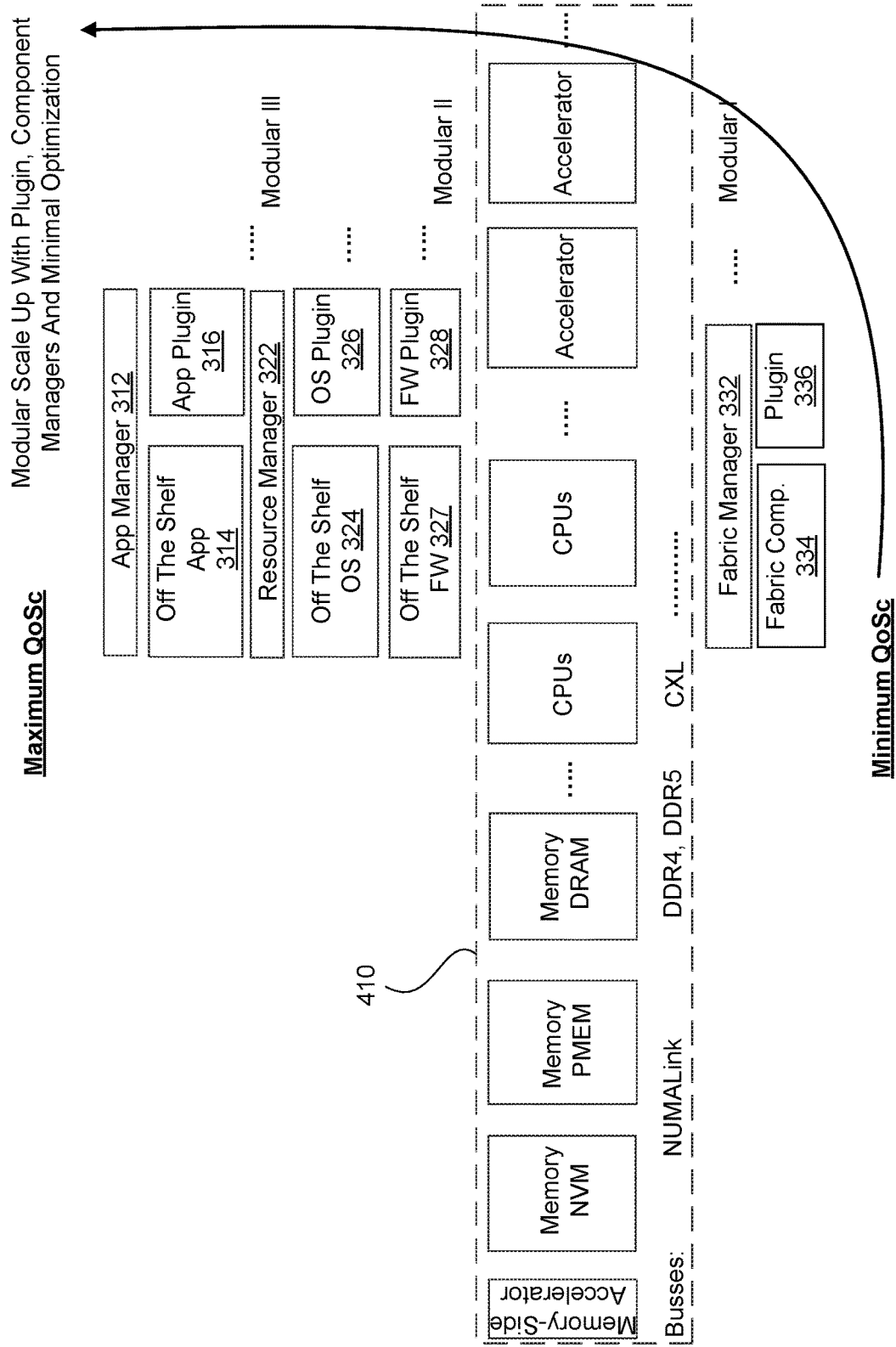
FIG. 4 illustrates quality of scaling (QoSc) characteristics in one or more configured switch systems, in accordance with one or more examples described herein.

FIG. 4 illustrates quality of scaling (QoSc) characteristics in one or more configured switch systems that may be implemented as the currently configured switch system 140 of FIG. 1 or currently configured switch system 240 of FIG. 2, in accordance with one or more examples described herein. For example, the QoSc characteristic determination may be used in switching between a first configured switch system to a second configured switch system (e.g., from a standard-scale memory configuration to a large-scale shared memory configuration).

At block 410, a trigger notification may initiate switching the currently configured switch system 140 from a first configured switch system to a second configured switch system, by switching between clusters of disaggregated components that correspond with each system definition. During the switching process, the QoSc characteristics are adjusted dynamically by the modular switch system 100 of FIG. 1 or the modular switch system 200 of FIG. 2.

For example, when the fabric components are adjusted in response to the trigger notification at the fabric layer (e.g., the fabric manager 332), the fabric manager 332 may instruct the corresponding plugin to reconfigure the layer (e.g., the fabric plugin 336). In another example, fabric manager 332 may instruct the adjustment of a memory-side accelerator, memory NVM, memory PMEM, memory DRAM, CPUs, accelerators, busses, links, or other components of the fabric layer (e.g., fabric component 334) via the fabric plugin 336. Various processes may be implemented at each layer of the currently configured switch system 140, including at the application layer by the application manager 312, at the resource layer by the resource manager 322, or at the fabric layer by the fabric manager 332, as illustrated with FIG. 3.

As the QoSc characteristics increase, the QoSc characteristics are adjusted dynamically at other layers corresponding with greater QoSc at other layers of currently configured switch system 140 in FIG. 1 or currently configured switch system 240 in FIG. 2, so that other components of the configured switch system are adjusted. Illustrative examples of QoSc characteristics at each of the policy manager layers are provided in FIG. 5.

Figure 5:
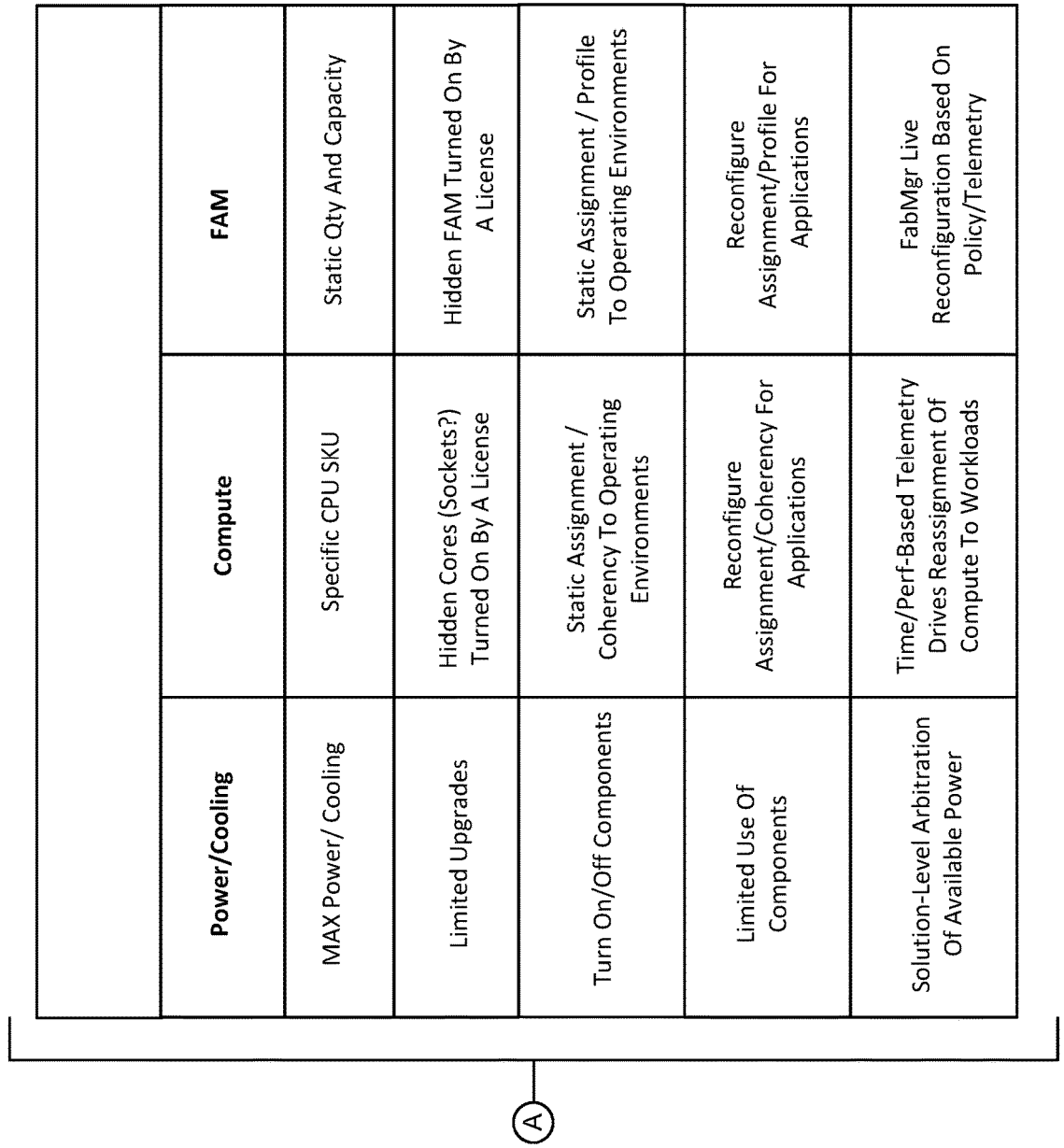
FIG. 5 illustrates various quality of scaling (QoSc) characteristics between each of the currently configured switch systems, in accordance with one or more examples described herein.

In FIG. 4, the illustrative switching process in relation to adjusted QoSc characteristics (e.g., increasing reconfigurability and scalability levels) are provided as examples. FIG. 5 provides additional examples of QoSc characteristics for illustrative purposes, which are not intended to limit the disclosure herein. As illustrated in table 500, some QoSc characteristics may include configuration time, a component that is commonly affected by the change in QoSc level, an identity of a user with access to configure the component, the interconnect at the QoSc level, power or cooling associated with the QoSc level, compute associated with the QoSc level, and the policy manager associated with the QoSc level.

At block 510, the reconfigurability and scalability options may be the lowest level of the illustrated QoSc examples. For example, the configuration time may be once at factory and may commonly affect the chassis. The configuration entity may be the manufacturer. The interconnect may be one or more hardware devices (e.g., a programmable application-specific integrated circuit (ASIC), HPE Slingshot interconnect, etc.). The power or cooling may correspond with a maximum power and cooling option in relation to other QoSc level. The compute may correspond with a specific CPU identifier. The policy manager may correspond with a static quantity and capacity.

At block 520, the reconfigurability and scalability options may be at a slightly greater level than block 510. For example, the configuration time may be at reorder, customizable, or may be reconfigured at a later time (more than once). The component that is commonly affected by the change at this level may be any hardware component except for the modular switch. The configuration entity may correspond with a customer or the manufacturer. The interconnect may be adding bridges. The power or cooling associated with this level may correspond with limited upgrades. The compute may correspond with hidden cores or sockets that are turned on by a license. The policy manager may correspond with a hidden manager that can be turned on by license.

At block 530, the reconfigurability and scalability options may be at a slightly greater level than block 520. For example, when comparing the QoSc characteristic of "configuration time," the measured values of the QoSc characteristic when the system is configured in accordance with block 530 may be greater than the measured values of the QoSc characteristic when the system is configured in accordance with block 520. Illustrative examples are again provided in FIG. 5. The configuration time may be at boot time or more often and may commonly affect plug-in cards. The configuration entity may be the customer. The interconnect may be to enable protocol features. The heating or cooling associated with this level may correspond with turning on and off components. The compute may correspond with various characteristics, from a static assignment or coherency to operating environments. The policy manager may correspond with various layers, including a static assignment or profile to operating environments.

At block 540, the reconfigurability and scalability options may be at a slightly greater level than block 530. For example, the configuration time may be at runtime or more frequent and may commonly affect programmatically reconfigurable modules. The configuration entity may correspond with a programmer or administrative user. The interconnect may be adding or removing memory semantics, adding put or get commands, or other configurable options in computer software. The power or cooling associated with this level may correspond with limited use of components. The compute may correspond with reconfigurable assignment or coherency values for various applications. The policy manager may correspond with a reconfiguration assignment or profile for various applications.

At block 550, the reconfigurability and scalability options may be at a slightly greater level than block 540, which may be at the highest level of reconfigurability and scalability provided in the illustration of FIG. 5. The configuration time may be automatic corresponding with providing a policy or trigger action and letting the components run on the administrator's behalf affect the operating environment, application telemetry, policy declarations, APIs, or other application components. The configuring entity may correspond with a fabric or resource manager. The interconnect may be dynamic performance parameter tuning based on a policy or telemetry. The power or cooling associated with this level a correspond with solution level arbitration available power. The compute may correspond with time- or preference-based telemetry that can drive the reassignment of compute workloads. The policy manager may correspond with a fabric manager live reconfiguration based on the policy or telemetry.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 6:
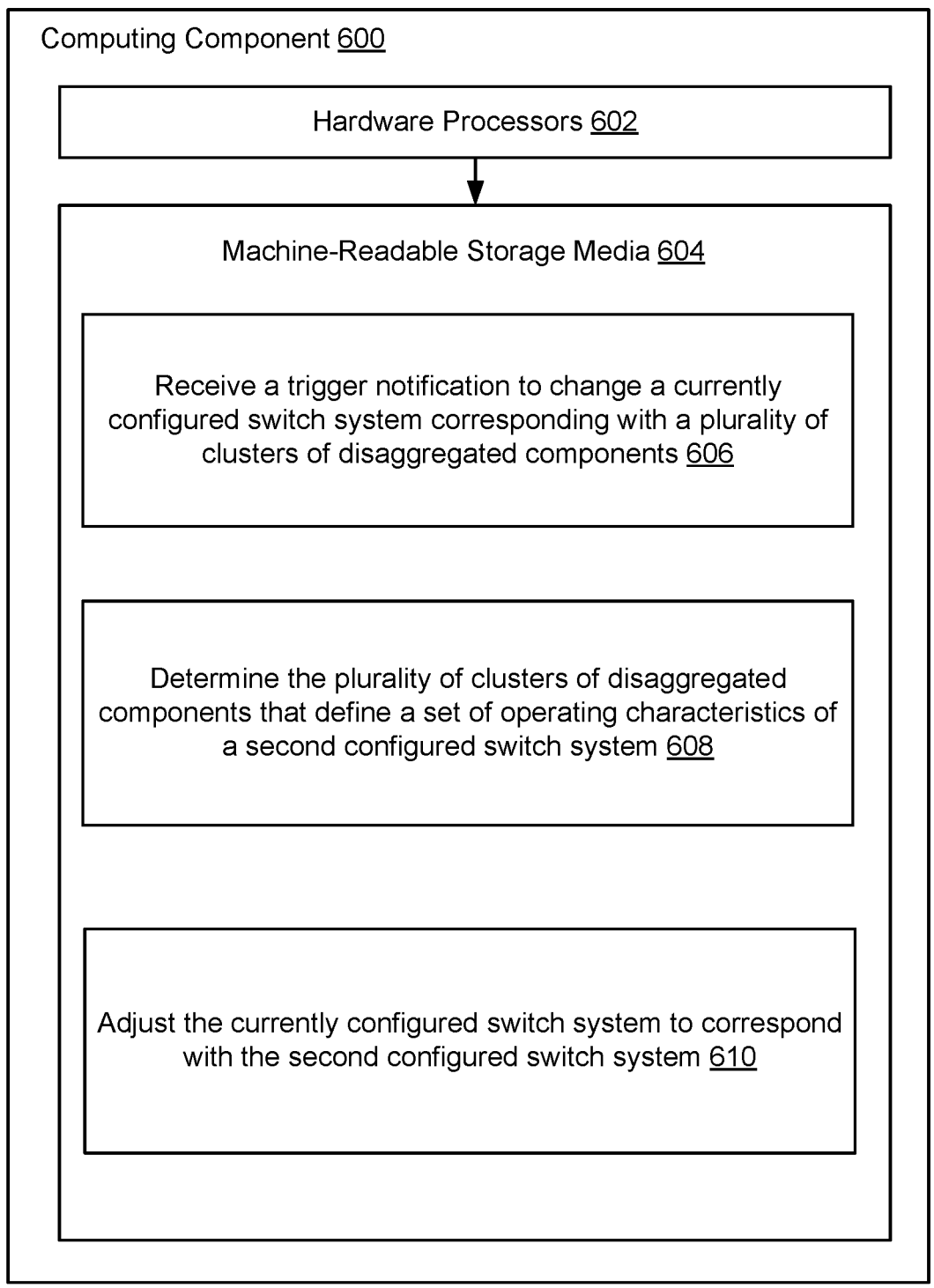
FIG. 6 is an example computing component that may be used to implement various features of embodiments described in the present disclosure.

FIG. 6 illustrates an example computing component that may be used to implement the dynamically modular and customizable computing systems in accordance with various embodiments. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-610, to control processes or operations for implementing the dynamically modular and customizable computing systems. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-610.

Hardware processor 602 may execute instruction 606 to receive a trigger notification to change a currently configured switch system corresponding with a plurality of clusters of disaggregated components. For example, modular switch system 100 illustrated in FIG. 1 or modular switch system 200 illustrated in FIG. 2 may implement the instruction that corresponds with currently configured switch system 140 in FIG. 1 or currently configured switch system 240 in FIG. 2.

In some examples, the trigger notification is associated with a workload processed by a currently configured switch system, the currently configured switch system is associated with a first configured switch system in a plurality of pre-defined configured switch systems, and a plurality of clusters of disaggregated components for a plurality of pre-defined configured switch systems correspond with a set of operating characteristics. The plurality of clusters of disaggregated components may comprise: a policy manager, one or more configurable options that process the workload received by the currently configured switch system in accordance with the each of the set of operating characteristics, and a plugin configured to implement the set of operating characteristics of a cluster of disaggregated components.

Hardware processor 602 may execute instruction 608 to determine the plurality of clusters of disaggregated components that define a set of operating characteristics of a second configured switch system. In some examples, the first configured switch system in the plurality of pre-defined configured switch system is different than the second configured switch systemin the plurality of pre-defined configured switch system.

Hardware processor 602 may execute instruction 610 to adjust the currently configured switch system to correspond with the second configured switch system. In some examples, the second configured switch system processes the workload using the plurality of clusters of disaggregated components associated with the second configured switch system that are different than the first configured switch system.

In some examples, the modular switch system may comprise a set of operating characteristics for a plurality of pre-defined configured switch systems, a plurality of clusters of disaggregated components that correspond with each of the set of operating characteristics, wherein each of the plurality of clusters of disaggregated components comprise: a policy manager, one or more configurable options that process a workload received by a currently configured switch system in accordance with the each of the set of operating characteristics, and a plugin configured to implement the set of operating characteristics of a cluster of disaggregated components, a commodity switch computing device configured to select a first configured switch system from the plurality of pre-defined configured switch systems; a processor; and a memory configured to store instructions.

In some examples, the set of operating characteristics change the set of configurable options from processing the workload over a latency threshold to processing the workload over a bandwidth threshold.

In some examples, the set of operating characteristics define different hardware requirements of a network interface controller (NIC).

In some examples, the policy manager comprises an application manager, a resource manager, or a fabric manager.

In some examples, the set of operating characteristics of the cluster of disaggregated components comprises a firmware plugin, an operating system plugin, or an application plugin.

In some examples, the trigger notification is activated at a boot time of the modular switch system.

In some examples, the trigger notification is dynamically received from a user device in communication with the modular switch system.

Figure 7:
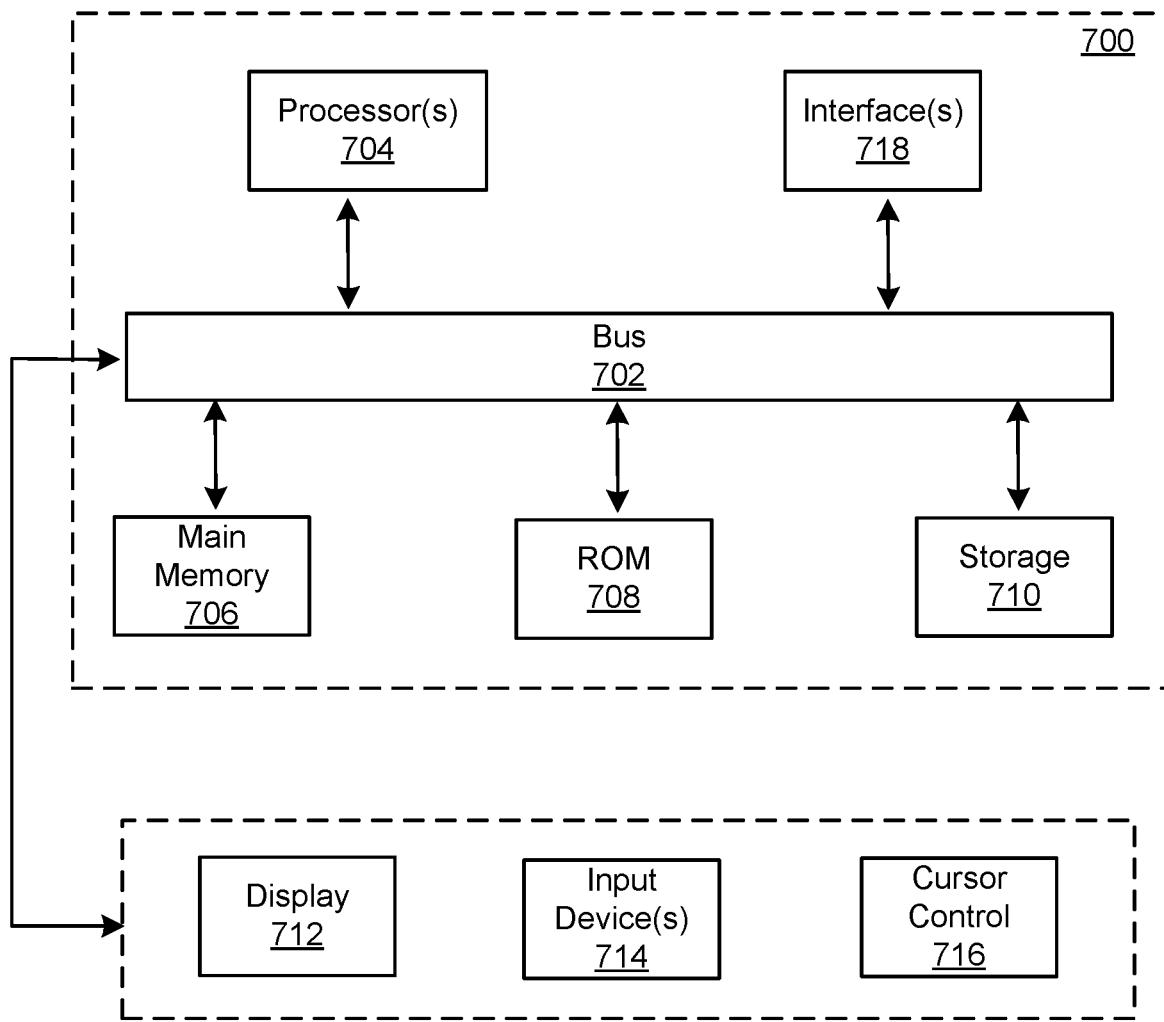
FIG. 7 depicts a block diagram of an example computer system in which various of the embodiments described herein may be implemented.

FIG. 7 depicts a block diagram of an example computer system 700 in which various of the embodiments described herein may be implemented. The computer system 700 may be used to execute machine readable instructions to perform the processes described herein. In some examples, computer system 700 may correspond with modular switch system 100 or currently configured switch system 140 of FIG. 1, although should not be limiting to the disclosure of components provided herein.

The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A modular switch system, comprising:
   a set of operating characteristics for a plurality of pre-defined configured switch systems;
   a plurality of clusters of disaggregated components that correspond with each of the set of operating characteristics, wherein each of the plurality of clusters of disaggregated components comprise:
   a policy manager,
   one or more configurable options that process a workload received by a currently configured switch system in accordance with the each of the set of operating characteristics, and
   a plugin configured to implement the set of operating characteristics of a cluster of disaggregated components;
   a commodity switch computing device configured to select a first configured switch system from the plurality of pre-defined configured switch systems;
   a processor; and
   a memory configured to store instructions that, when executed by the processor, cause the processor to:
   determine the plurality of clusters of disaggregated components that define the set of operating characteristics of a second configured switch system, wherein the first configured switch system in the plurality of pre-defined configured switch system is different than the second configured switch system in the plurality of pre-defined configured switch system; and
   adjust the currently configured switch system to correspond with the second configured switch system, wherein the second configured switch system processes the workload using the plurality of clusters of disaggregated components associated with the second configured switch system that are different than the first configured switch system.

2. The modular switch system of claim 1, wherein the set of operating characteristics change the set of configurable options from processing the workload over a latency threshold to processing the workload over a bandwidth threshold.

3. The modular switch system of claim 1, wherein the set of operating characteristics define different hardware requirements of a network interface controller (NIC).

4. The modular switch system of claim 1, wherein the policy manager comprises an application manager, a resource manager, or a fabric manager.

5. The modular switch system of claim 1, wherein the set of operating characteristics of the cluster of disaggregated components comprises a firmware plugin, an operating system plugin, or an application plugin.

6. The modular switch system of claim 1, wherein the adjustment of the currently configured switch system to the second configured switch system is triggered at boot time of the currently configured switch system.

7. The modular switch system of claim 1, wherein the adjustment of the currently configured switch system to the second configured switch system is triggered autonomously.

8. The modular switch system of claim 1, wherein the adjustment of the currently configured switch system to the second configured switch system is triggered by a request received from a user device.

9. A computer-implemented method comprising:
receiving, by a modular switch system, a trigger notification, wherein the trigger notification is associated with a workload processed by a currently configured switch system, wherein the currently configured switch system is associated with a first configured switch system in a plurality of pre-defined configured switch systems, wherein a plurality of clusters of disaggregated components for a plurality of pre-defined configured switch systems correspond with a set of operating characteristics, wherein each of the plurality of clusters of disaggregated components comprise:
a policy manager,
one or more configurable options that process the workload received by the currently configured switch system in accordance with the each of the set of operating characteristics, and
a plugin configured to implement the set of operating characteristics of a cluster of disaggregated components;
determining, by the modular switch system, the plurality of clusters of disaggregated components that define the set of operating characteristics of a second configured switch system, wherein the first configured switch system in the plurality of pre-defined configured switch system is different than the second configured switch system in the plurality of pre-defined configured switch system; and
adjusting, by the modular switch system, the currently configured switch system to correspond with the second configured switch system, wherein the second configured switch system processes the workload using the plurality of clusters of disaggregated components associated with the second configured switch system that are different than the first configured switch system.

10. The method of claim 9, wherein the set of operating characteristics change the set of configurable options from processing the workload over a latency threshold to processing the workload over a bandwidth threshold.

11. The method of claim 9, wherein the set of operating characteristics define different hardware requirements of a network interface controller (NIC).

12. The method of claim 9, wherein the policy manager comprises an application manager, a resource manager, or a fabric manager.

13. The method of claim 9, wherein the set of operating characteristics of the cluster of disaggregated components comprises a firmware plugin, an operating system plugin, or an application plugin.

14. The method of claim 9, wherein the trigger notification is activated at a boot time of the modular switch system.

15. The method of claim 9, wherein the trigger notification is activated autonomously.

16. The method of claim 9, wherein the trigger notification is dynamically received from a user device in communication with the modular switch system.

17. A non-transitory computer-readable storage medium storing a plurality of instructions executable by one or more processors, the plurality of instructions when executed by the one or more processors cause the one or more processor to:
receiving, by a modular switch system, a trigger notification, wherein the trigger notification is associated with a workload processed by a currently configured switch system, wherein the currently configured switch system is associated with a first configured switch system in a plurality of pre-defined configured switch systems, wherein a plurality of clusters of disaggregated components for a plurality of pre-defined configured switch systems correspond with a set of operating characteristics, wherein each of the plurality of clusters of disaggregated components comprise:
a policy manager,
one or more configurable options that process the workload received by the currently configured switch system in accordance with the each of the set of operating characteristics, and
a plugin configured to implement the set of operating characteristics of a cluster of disaggregated components;
determining, by the configured switch system, the plurality of clusters of disaggregated components that define the set of operating characteristics of a second configured switch system, wherein the first configured switch systemin the plurality of pre-defined configured switch system is different than the second configured switch system in the plurality of pre-defined configured switch system; and
adjusting, by the modular switch system, the currently configured switch system to correspond with the second configured switch system, wherein the second configured switch system processes the workload using the plurality of clusters of disaggregated components associated with the second configured switch system that are different than the first configured switch system.

18. The non-transitory computer-readable storage medium of claim 17, wherein the set of operating characteristics change the set of configurable options from processing the workload over a latency threshold to processing the workload over a bandwidth threshold.

19. The non-transitory computer-readable storage medium of claim 17, wherein the set of operating characteristics define different hardware requirements of a network interface controller (NIC).

20. The non-transitory computer-readable storage medium of claim 17, wherein the policy manager comprises an application manager, a resource manager, or a fabric manager.

21. The non-transitory computer-readable storage medium of claim 17, wherein the set of operating characteristics of the cluster of disaggregated components comprises a firmware plugin, an operating system plugin, or an application plugin.

\* \* \* \* \*